(12) United States Patent
DiMambro

(10) Patent No.: US 8,537,815 B2
(45) Date of Patent: *Sep. 17, 2013

(54) ACCELERATING DATA ROUTING

(75) Inventor: Francesco DiMambro, San Jose, CA (US)

(73) Assignee: Apple Inc., Cupertino, CA (US)

( * ) Notice: Subject to any disclaimer, the term of this patent is extended or adjusted under 35 U.S.C. 154(b) by 470 days.

This patent is subject to a terminal disclaimer.

(21) Appl. No.: 12/817,834

(22) Filed: Jun. 17, 2010

(65) Prior Publication Data

US 2011/0310892 A1    Dec. 22, 2011

(51) Int. Cl.
*H04L 12/28* (2006.01)

(52) U.S. Cl.
USPC ........... 370/389; 370/412; 370/473; 370/474; 709/230

(58) Field of Classification Search
USPC ................ 370/389, 473, 472, 474; 709/230, 709/236
See application file for complete search history.

(56) References Cited

U.S. PATENT DOCUMENTS

| | | | |
|---|---|---|---|
| 5,774,469 A * | 6/1998 | Wirkestrand | 370/473 |
| 6,571,291 B1 * | 5/2003 | Chow | 709/230 |
| 6,721,334 B1 * | 4/2004 | Ketcham | 370/473 |
| 6,728,349 B2 | 4/2004 | Chang et al. | |
| 6,842,622 B2 | 1/2005 | Peters et al. | |
| 6,981,074 B2 * | 12/2005 | Oner et al. | 710/32 |
| 7,080,236 B2 * | 7/2006 | Jourdan et al. | 712/202 |
| 7,190,351 B1 | 3/2007 | Goren | |
| 7,233,229 B2 | 6/2007 | Stroupe et al. | |
| 7,315,614 B2 | 1/2008 | Bedingfield, Jr. et al. | |
| 7,362,854 B2 | 4/2008 | McKnight | |
| 7,630,724 B2 | 12/2009 | Beyer, Jr. et al. | |
| 8,036,246 B2 * | 10/2011 | Makineni et al. | 370/474 |
| 2001/0029194 A1 | 10/2001 | Ketola et al. | |
| 2003/0236916 A1 * | 12/2003 | Adcox et al. | 709/245 |
| 2006/0229107 A1 | 10/2006 | Cho et al. | |
| 2008/0039152 A1 | 2/2008 | Arisawa | |
| 2009/0028179 A1 | 1/2009 | Albal | |
| 2010/0189103 A1 * | 7/2010 | Bachmann et al. | 370/389 |
| 2010/0203904 A1 | 8/2010 | Khokhlov | |
| 2011/0076989 A1 | 3/2011 | Lynch | |
| 2011/0085549 A1 | 4/2011 | DiMambro | |

FOREIGN PATENT DOCUMENTS

| EP | 1071295 | 1/2001 |
|---|---|---|
| EP | 2148531 | 1/2010 |

OTHER PUBLICATIONS

Evans, Joel, "Review of Samsung Instinct," geek.com, 23 pages, Jul. 8, 2008.

* cited by examiner

*Primary Examiner* — Andrew Chriss
*Assistant Examiner* — Mohamed Kamara
(74) *Attorney, Agent, or Firm* — Michael H. Lyons

(57) ABSTRACT

Systems, devices and methods for improving network performance are disclosed. In particular, in one embodiment, a method of processing data packets in an electronic network is provided. The method includes receiving data packets at a receive stack of an electronic network device and creating a first packet from at least a portion of each of the set of data packets. The first packet includes an indicator that the first packet is a first packet type. The creation of the first packet includes saving a first header of the plurality of data packets, modifying the first header with information from each of the set of data packets, and concatenating the set of data packets.

18 Claims, 9 Drawing Sheets

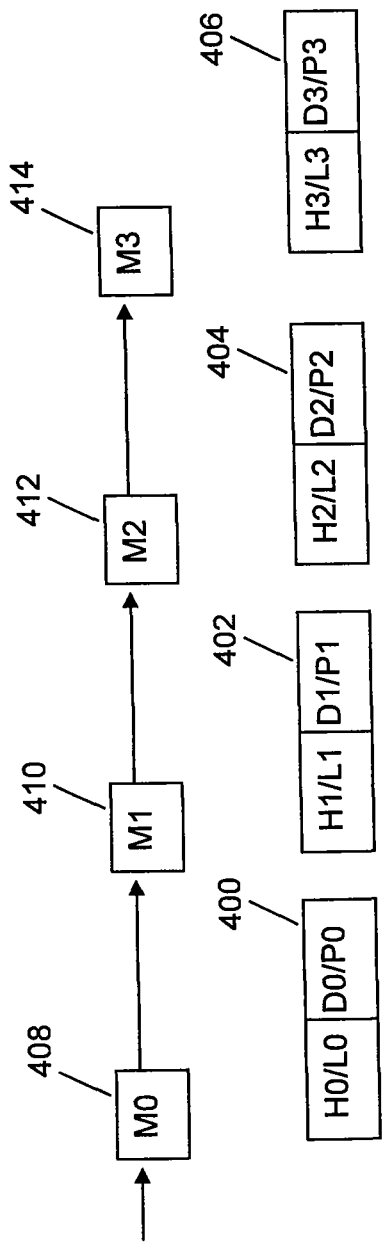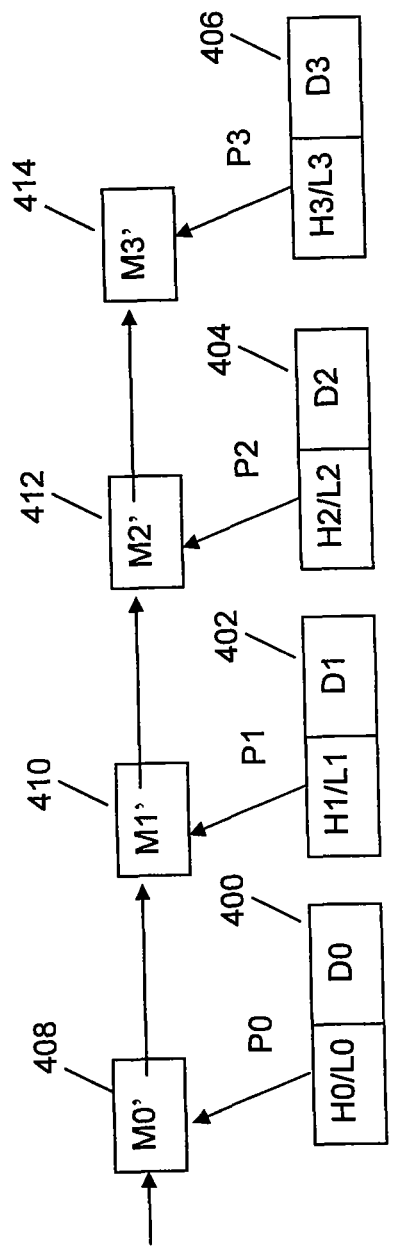
Fig. 8
Fig. 9

ACCELERATING DATA ROUTING

TECHNICAL FIELD

The present application relates generally to computer networks, and more particularly to improving computer network performance.

BACKGROUND

In simple terms, computer networks facilitate the sharing of data between computing devices. The shared data may pass through multiple network devices and or multiple networks. Typically, such devices may receive data at a first interface and route or forward the data to a second interface that transmits the data onward through the network. At each interface, information associated with the data is processed so that the data is properly routed to eventually reach its destination. This processing, unfortunately, may add latency to data sharing and consumes processing power. Furthermore, data throughput may be negatively impacted.

Generally, the latency and data throughput at a particular interface may not be particularly noteworthy; however, in the aggregate, this latency and reduced data throughput may be significant. Additionally, the issues may be exacerbated when relatively large amounts of data are shared or transmitted. This may be due to size limitations imposed on certain transmissions and/or by particular devices, for example.

Various techniques have been implemented to reduce the latency and increase data throughput of data transmission through networks. Despite success with certain techniques, there remains opportunity for improvement.

SUMMARY

Aspects of the present disclosure include systems, devices and methods for improving network performance. In particular, in one embodiment, a method of processing data packets in an electronic network is provided. The method may include the operations of receiving data packets at a receive stack of an electronic network device and creating a first packet from at least a portion of each of the set of data packets. The first packet includes an indicator that the first packet is a first packet type. The creation of the first packet includes saving a first header of the plurality of data packets, modifying the first header with information from each of the set of data packets, and concatenating the set of data packets.

Another aspect takes the form of a method for operating a network device. The method includes receiving a plurality of data packets at a receive stack of the network device and generating a combined packet from the received plurality of data packets. The generating of the combined packet includes subtracting a payload checksum from each of the plurality of data packets, placing the payload checksums in a meta-structure and concatenating the plurality of data packets.

Yet another aspect takes the form of an electronic network device having a processor and a memory coupled to the processor that stores operating instructions for the operation of the network device. The device also includes a transmit stack and a receive stack operated by the processor, with each of the transmit stack and receive stack including a plurality of operative layers. The receive stack has a first layer executable by the processor to receive a plurality of data packets. The processor of the device being configured to create a combined packet from the plurality of data packets. The processor is also configured to operate the network device to pass the combined packet to the transmit stack with checksum data related to the plurality of data packets and reconstitute the plurality of data packets using the checksum data.

DRAWINGS

FIG. 8 illustrates packets and meta-structure related to a communication.

FIG. 9 illustrates moving checksum information from the packets of FIG. 8 into the meta-structure.

Figure 10:
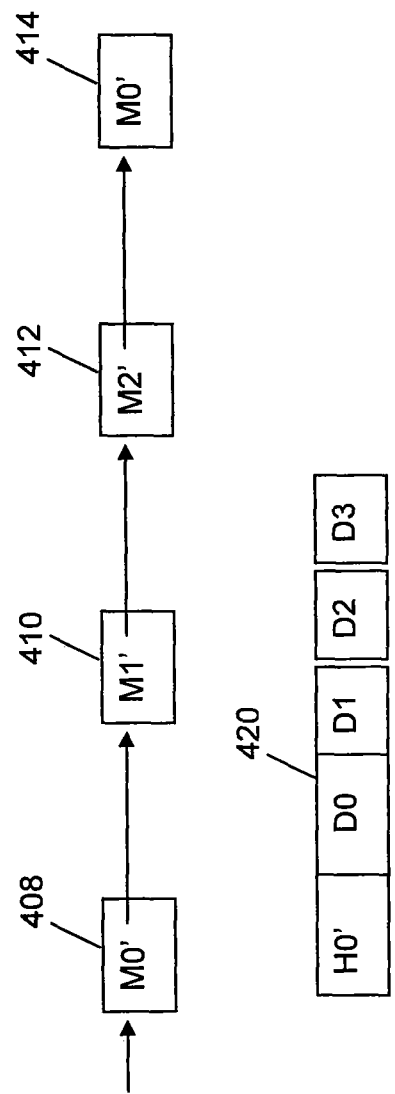
FIG. 10 illustrates a combined packet from the packets of FIG. 8 with modified meta-structure.
Figure 11:
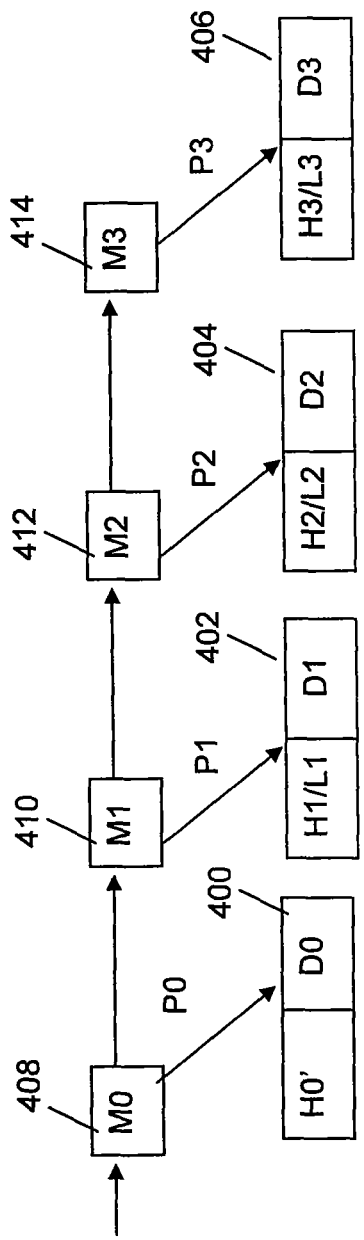

FIG. 11 partially illustrates segmentation of the combined packet of FIG. 10 with checksum information provided from the meta-structure.

DETAILED DESCRIPTION

Generally, one embodiment includes systems and methods for expediting the routing of data packets through a network device. In particular, network devices may be configured to concatenate received packets into a combined packet, such as a large receive offload (LRO) packet, route the combined packet to a transmit stack, thereby bypassing multiple layers of the receive and transmit stacks, and characterize the combined packet as a packet recognized in the transmit stack, such as a transmit segment offload (TSO). This process is generally described in U.S. patent application Ser. No. 12/578,181 filed Oct. 12, 2009, and entitled, "Data Routing Acceleration," which is incorporated herein by reference in its entirety and for all purposes. To further accelerate the routing of the data packets, information related to the concatenated packets may be preserved as the combined packet is moved from the receive stack to the transmit stack.

In some embodiments, a first header of the combined packet (such as an LRO packet) is updated with checksums, acknowledgement numbers, flags, and timestamps as packets are concatenated to form the LRO packet. Information related to the concatenated packets is hidden behind a pointer indicating where data for the packet starts (referred to as a "start of data" pointer) for each packet. In particular, when a packet is received, it may include a layer 2 header (e.g., Ethernet header), an IP header and a TCP header. The start of data pointer is initially directed to the beginning of the layer 2 header so that the headers are "shown". When the LRO packet is created, however, the start of data pointer is moved so that the headers are behind the start of data pointer, effectively hiding the headers. That is, the start of data pointer is moved to the beginning of the payload data. The headers remain in the buffer, but are hidden because the start of data pointer has been moved. This allows for the headers to pass through to the transmit stack without being modified.

When the LRO packet arrives in the transmit stack, the checksum, acknowledgement numbers, flags, and timestamps are restored to the packets and the modified first header is restored. That is, a checksum for the first header is recalculated. With the checksums, acknowledgement numbers, flags, and timestamps being restored to the packets, each packet is a reflection of the originally received packets and the start of data pointer is moved back to point to the start the layer 2 header, e.g., move the pointer forward to show the layer 2 header, IP header and TCP header.

In some embodiments, the LRO packet is routed to the transmit stack after the first header is substantially replaced, thereby rendering recalculation of the checksum of the first header difficult. To avoid recalculating checksums, as the LRO packet is assembled, the checksums may be retrieved from the incoming packets and placed in the packet meta-structure. The meta-structure includes information related to the packets and is transmitted with the packets. In some embodiments, as is the case here, the meta-structure also carries payload checksums for packets of the LRO packet. When the packets are reconstructed into the individual packets from the LRO packet in the transmit stack, the checksums of the individual packets may be provided from the meta-structure.

Checks may be removed to facilitate transfer of the LRO packet through the software stack. For example, size checks may be removed from the processing path of the LRO packets to allow the packets to be transmitted at lower layers of a software stack. Upon removal of the checks, the LRO data packets may then be forwarded from a receive stack to a transmit stack via a bridge layer or a network layer. Once in the transmit stack, the data packets may be classified as a packet recognizable in the transmit stack to be processed as a whole in a firmware layer. The classification the data packet may include setting a bit in a header indicating the data packet as a recognized classification. Upon being recognized in the transmit stack, the data packets are directed to a driver in the transmit stack for segmentation and generation of checksums to facilitate transmission of the data packets.

In one embodiment, the method relates to receiving large receive offset (LRO) packets and removing size checks in certain layers of the protocol stack (e.g., in bridge, Network Address Translation (NAT), and Internet Protocol (IP) layers) to allow forwarding of the LRO packet at those layers to the transmit stack, bypassing an applications layer. To remove the size checks, a header in the LRO packets may be modified. Additionally, the bridge and IP layers may be modified such that they recognize the LRO packet and do not reject the LRO packet. Once in the transmit stack, the LRO packet may be classified as a transmit segmentation offload packet (TSO) and forwarded to a driver in the transmit stack.

In order to facilitate the passing of the LRO packet from a receive stack to a transmit stack, current LRO implementations are enhanced to detect a maximum segment size (MSS). Accordingly, a packet size monitor is added in the present LRO implementation to allow for determination of the MSS. As packets are received and added to the LRO chain, the largest received packet size is used to set the MSS. The determined MSS is provided to the transmit stack and used by the TSO to segment the packets for transmission.

In conventional implementations, the MSS is provided in the TCP/IP three way connection handshake, but LRO is speculatively activated based on packet arrival rate after the three-way handshake has been completed, thus missing the opportunity to establish the MSS. Additionally, conventional LRO is not concerned with MSS because the LRO packets terminate at the receiving device. In contrast, the present disclosure allows for the LRO packets to be re-transmitted using TSO.

In addition to the LRO data packets being passed to the transmission stack, packet maps are created when the large receive offload data packets are received. Specifically, when the data packets from a single large communication are received and a LRO data packet is created, the data packets of the LRO data packet are mapped. As the LRO data packet is directly converted into a TSO data packet in the transmit stack, the maps created in conjunction with the LRO data packet may be used. Hence, the transmission stack does not need to generate packet maps. In one embodiment, the packet maps are receive packet (Rx Pkt) DMA maps. The Rx Pkt DMA maps can be reused on the transmission side, avoiding the current requirement of regenerating the map when the received packets that are to be forwarded arrive on the transmission stack.

In another embodiment, hardware in the transmission stack may not be configured to process TSO data packets. That is, hardware in the transmit stack may not be TSO compliant and, thus, unable to segment the packets. Hence, one or more software layers (e.g., the IP, NAT, and/or bridge layers) in the transmit stack may be configured to perform segmentation of the TSO data packets, in addition to other functionality described herein. Specifically, software in the IP layer in the case of IP layer routing, NAT layer in the case of NAT layer routing, or the Bridge layer in the case of layer 2 bridging reconstitutes the packets rather than the hardware that is not ISO capable.

The preserving of checksums avoids the expense, in terms of processing power and time, of recalculating the checksums on in the transmit stack. There are at least two cases in which the reconstruction of the checksums may occur. In a first case, which may be referred to as "the bridge case," TSO operation reconstructs the first header to restore the checksum. In one embodiment, this is done by recalculating the checksum across the complete first packet. That is, a checksum including a checksum for headers associated with the packet and a checksum for the payload is calculated. The rest of the LRO packet may be broken at packet boundaries indicated by a packet header flag, and the data pointer may be moved back to point to the start of a layer 2 header. These operations reconstruct the received packets into the form they were in when they were received.

In the second case, which may be referred to as "the NAT case," the first header will have been replaced as the combined packet is moved up the receive stack in the course of routing the combined packet. Because the first header is replaced, the technique implemented in the bridge case is unusable. In one embodiment, the LRO can proactively subtract a checksum from the incoming packet as it is being concatenated to the LRO flow. The checksum may be for the data alone and can be carried to the transmit stack from the receive stack by the packet meta-structure. When the TSO reconstructs the packets from the LRO packet the checksums are provided from the meta-structure. Thus, rather than recalculating the checksum over the complete packet, the first header is calculated and a complete checksum (non payload checksum plus payload checksum) are calculated for the packets.

In some embodiments, the removal of the data checksum from the complete checksum may be performed in software. The data checksum represents the checksum of the data or payload. Whereas the complete checksum represents the checksum of an entire packet including the headers and data. In other embodiments, the removal of the checksum may be performed by hardware where the partial checksum can be passed to the software in the receiving descriptor.

It should be appreciated that through the various techniques set forth herein network latency and data throughput may be improved. That is, latency may decrease and data throughput increases, due to the reduced per byte cost of moving data through a router.

Figure 1:
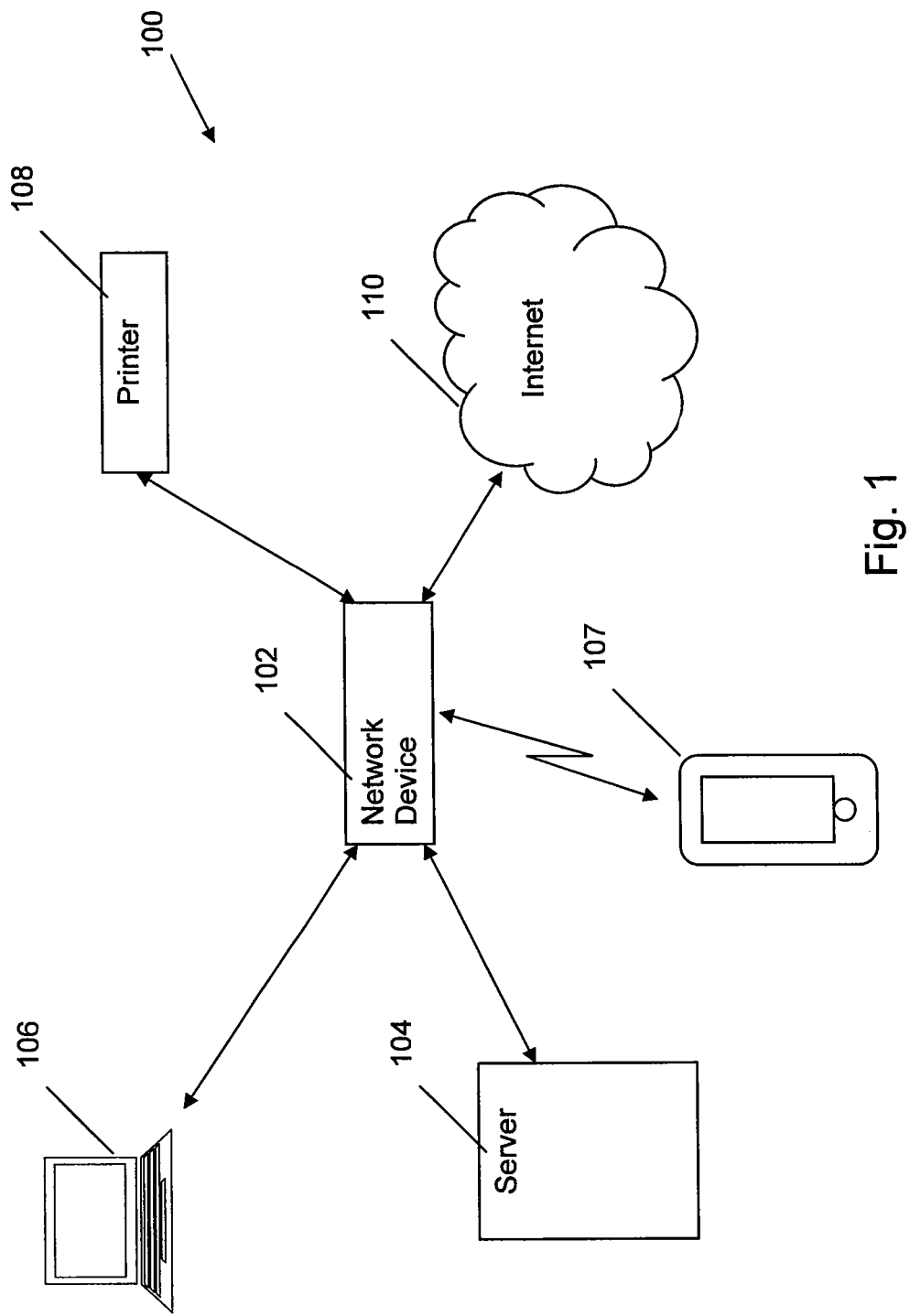
FIG. 1 illustrates an example electronic communications network and associated devices.

Turning now to the drawings and referring initially to FIG. 1, an electronic communications system 100 is illustrated. The electronic communications system 100 includes a network device 102 that is communicatively coupled to various other devices of the system 100. As one non-limiting example, the network device 102 may be communicatively coupled to a notebook computing device 104, a server 106, a wireless computing device 107, a printer 108 and the Internet 110 (or any other network service). Each of the various devices of the system 100 include hardware and software to enable the devices to communicate data with other devices in the system 100 and various type of such devices are available commercially. The wireless computing device 107, for example, may be a wireless multi-media device, a smart phone, a tablet computing device, or any other wireless communication device.

The various devices of the system 100 may be communicatively coupled together via any available communication medium and various communications media may be used within the system 100. For example, the notebook computer 104 may be communicatively coupled to the network device 102 via a wired communication link (such as an Ethernet cable), while the server 106 may be coupled to the network device 102 via a fiber optic link and the printer 108 may be coupled to the network device 108 via a wireless communication link (e.g., WiFi).

The network device 102, can be any computing device that can connect to the network and process packets as described herein, typically with an inbound and outbound protocol stack. For example, in some embodiments, the network device 102 may be configured as a router for processing and routing data packets between devices of the system 100. In other embodiments, the network device 102 may be a computer, server, mobile computing device, etc.

Figure 2:
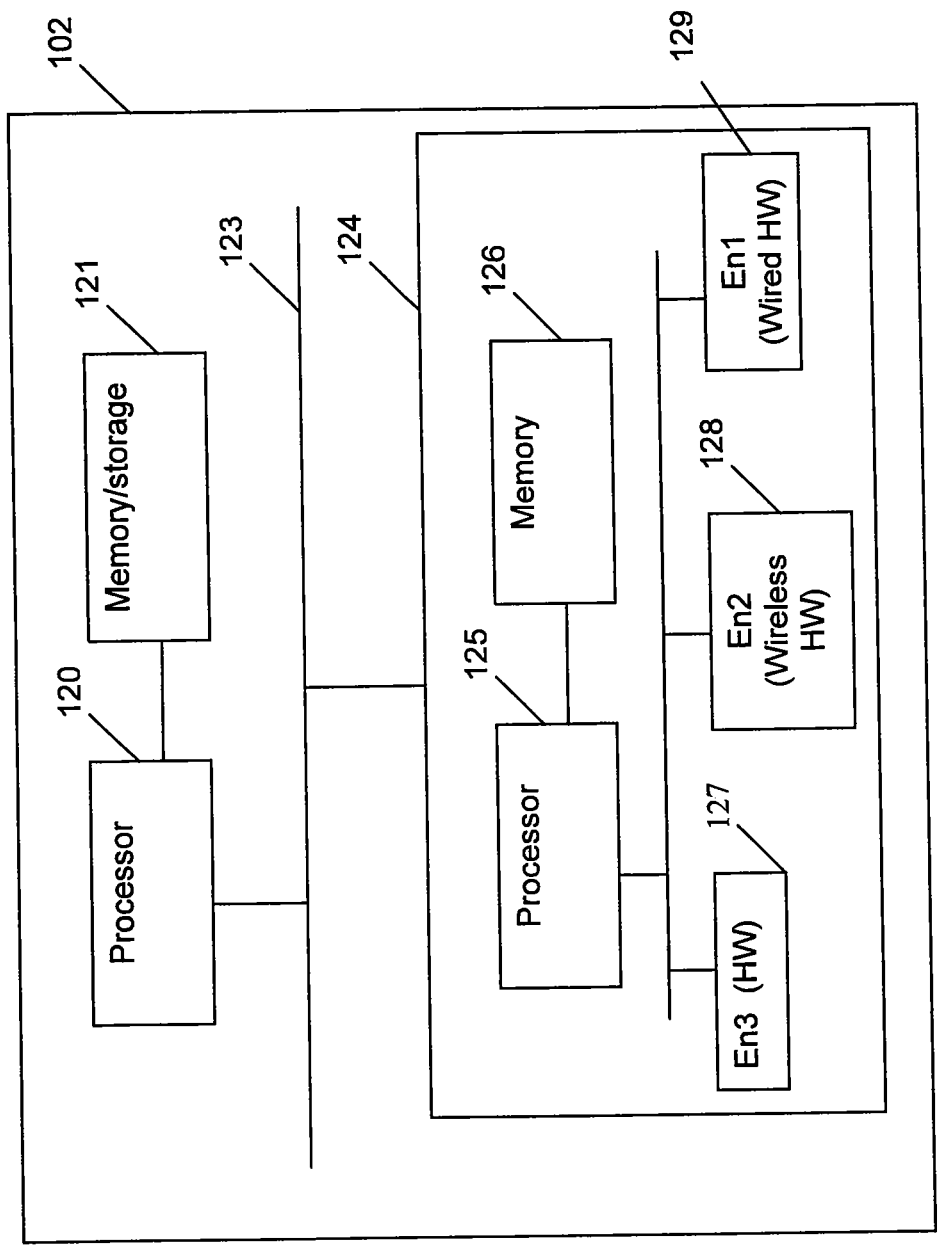
FIG. 2 is an example block diagram of a network device associated with the electronic communications network of FIG. 1.

A simplified block diagram of the network device 102 is illustrated in FIG. 2. The network device 102 includes a processor 120 and a memory 122. The processor 102 may be any suitable processor, such as a Core i7 series processor from Intel™, or an Phenom series processor from AMD™, for example. In some embodiments, the device 102 may include multiple processors and/or one or more multi-core processors. The memory 121 is coupled to the processor 120. The memory 122 may include one or more types of electronic memory including read only memory (ROM), electrically erasable programmable ROM, flash, random access memory (RAM), dynamic RAM, and so forth. Additionally, the memory 121 may include storage memory including hard disk drives, solid state drives, etc. The memory 122 includes instructions executable by the processor 120 for the operation of the network device 102.

The processor 120 may be coupled to a bus 123 (or other communication conduit) that may be coupled to other electronic devices of the network device 102. In particular, the bus 123 may couple the processor 120 to a network card 124. It should be appreciated that one or more other devices may be coupled to the bus 123 and may be integrated into the network device 102. As such, the block diagram, of FIG. 2 is not intended to include all component parts of the network device but, rather, is simplified for the purposes of this description.

The network card 124 includes component parts for facilitating network communications. Specifically, the network card 124 includes a dedicated processor 125 and a memory 126 for the receiving and transmitting data via communication ports 127, 128 and 129. The processor 125 may be a suitable processor for handling network communications.

The communication ports 127, 128 and 129 are coupled to the processor 125 and may be configured to support particular communication protocols. For example, communication ports 127, 128 and 129 may be configured to support Ethernet communications, fiber optic communications, or WiFi communications. In some embodiments, one or more communication ports may support a communication protocol that is different from a communications protocol supported by the other ports. Additionally, the communication ports 127, 128 and 129 are each configured to both transmit and receive data communications.

The memory 126 of the network card 124 may include one or more types of electronic memory including read only memory (ROM), electrically erasable programmable ROM, flash, random access memory (RAM), dynamic RAM, etc. The memory 126 includes instructions executable by the processor 125 for the receiving, processing and transmission of data packets. In some embodiments, the processor 125 and memory 126 may be part of an application specific integrated circuit (ASIC) or a system-on-chip (SOC). For example, Broadcom's BCM4712KFB SOC may be used. In other embodiments, the processor 125 and memory 126 may be discrete component parts of the network card 124.

The network card 124 and, more generally, the network device 102, is configured to receive, route and transmit data packets within the system 100. As such, the network device 102 includes one or more, software implemented receive stacks and one or more transmit stacks. Each of the receive and transmit stacks includes multiple layers. Each layer may include hardware, software or a combination of the two. Each layer may be dedicated to performing a distinct processing operation for the processing of data packets. Generally, transmission of packets progresses downward through the stack while receipt of packets progresses upward through the stack.

Figure 3:
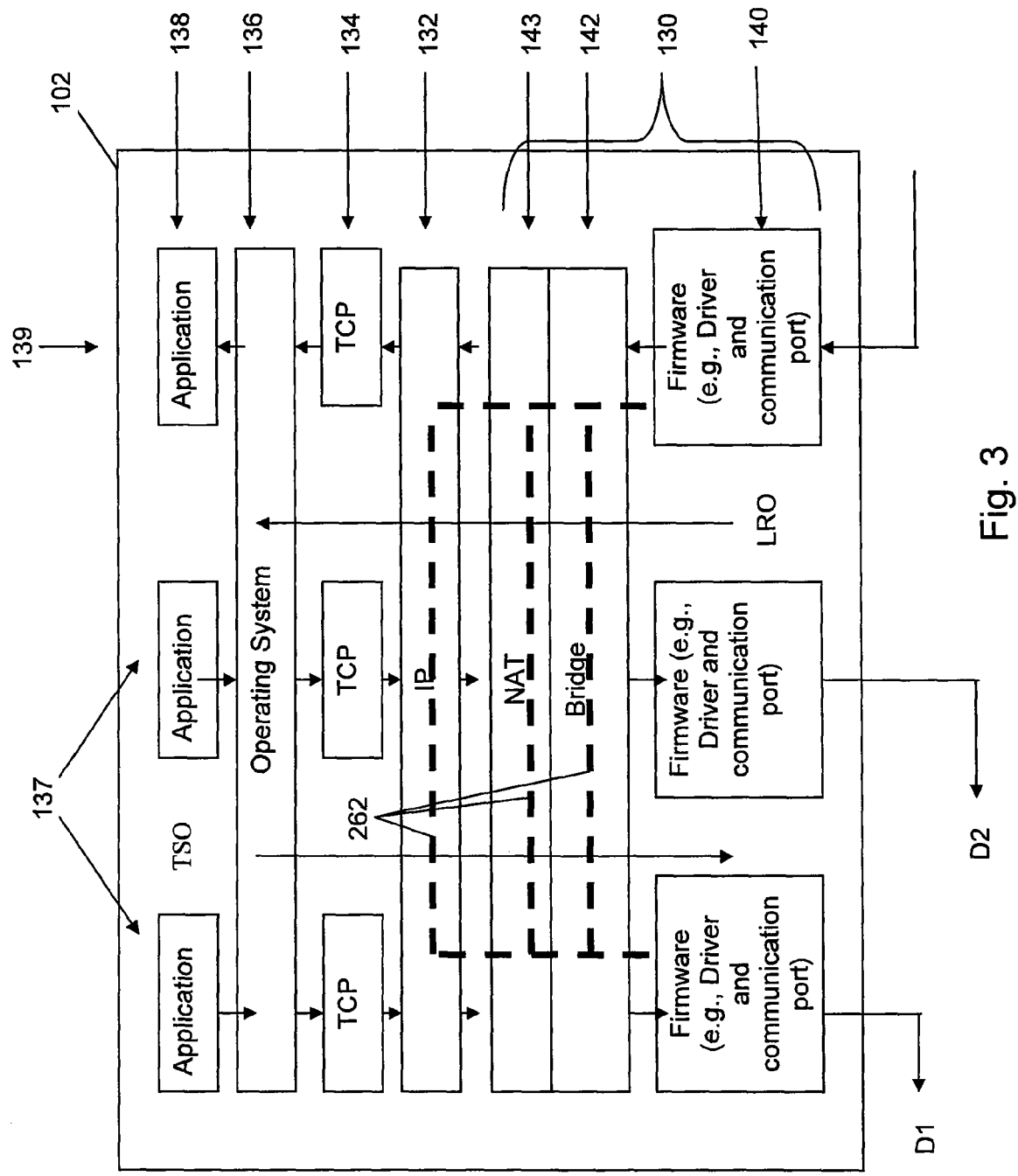
FIG. 3 illustrates software stacks for receipt and transmission of data by the network device of FIG. 2.

In one embodiment, as illustrated in FIG. 3, the network device 102 includes a data link layer 130, an internet protocol (IP) layer 132, a TCP layer 134, an operating system layer 136 and an applications layer 138. FIG. 3 illustrates two transmit stacks 137 and a receive stack 139. Generally, the transmit stacks 137 and the receive stack 139 include the same layers. It should be appreciated, however, that other embodiments may include more or fewer layers and, further, that the function of the layers may not be delineated in the manner set forth herein. As such, in some embodiments, a particular layer may be configured to perform tasks performed by an adjacent layer in other embodiments. Accordingly, the various illustrated layers and the following description are to be understood as merely exemplary and various other implementations may be conceived and implemented that may be considered equivalent thereto.

The data link layer 130 may include firmware 140, which includes hardware such as the communication ports 127, 128 and 129, and a driver for supporting the operation of the hardware in accordance with a particular communication protocol. The data link layer 130 also typically includes a bridge layer 142 that may be accessible to multiple transmit and receive stacks. A network address translation (NAT) layer 143 may also be implemented in the data link layer 130. The NAT layer 143 may provide address translation for a given network. That is, the NAT layer may modify addresses of received packets so that they may correspond to an address of a device on the IP network configured behind the NAT. In some embodiments, an address is given to the packets for use within the device and original addresses are restored when packets leave the device. It should be appreciated that the address translation and therefore the NAT layer 143 may be implemented in other layers, such as the IP layer for example. The data link layer 130 generally may perform validation checks on received packets. Additionally, the data link layer 130 may perform segmentation and generate checksums for outgoing packets.

In some embodiments, the firmware 140 may support Ethernet communications under the IEEE 802.3 standard. In other embodiments, the firmware 140 may support other communication protocols such as wireless protocols (e.g., 802.11 a/b/g/n), fiber optic communication protocols, etc. Additionally, in some embodiments, the firmware 140 (i.e., the driver) may be configured to perform segmentation in accordance with the TSO protocol. If the driver is TSO capable, it may communicate its capability with other layers of the stack so that if the other layers of the stack receive a large packet, the packet may be labeled as a TSO packet and forwarded to the driver for segmentation. Additionally, although there are three firmware blocks illustrated, it should be appreciated that each may be configured to both transmit and receive data communications.

The bridge layer 142 may be configured to verify received frames and/or packets. Specifically, the bridge layer 142 may check a received frame's size, a checksum of the received frame, and an address for the frame, among other things. If the received packets are found to be valid, a header for the hardware layer may be removed and the packet is transmitted to the IP layer 132. Additionally, the bridge layer 142 may convert the packet from LRO to TSO and transmit the packet to the transmit stack, as discussed later in greater detail.

The IP layer 132 generally represents a network layer for performing routing functions. In some embodiments, the IP layer 132 may perform fragmentation of packets to a suitable size for transmission over the data link layer 130. Conversely, upon receiving fragmented packets, the IP layer 132 may be tasked with reassembly of the packets. The IP layer 132 also detects for discarding packets that contain errors. Additionally, the IP layer 132 may convert the packet from LRO to TSO and transmit the packet to the transmit stack, as discussed later in greater detail. While Internet Protocol (IP) is the most common protocol used, it should be appreciated that other protocols may be implemented to achieve the same or similar functionality.

The TCP layer 134 represents a transport layer for transparent transfer of data and controls the reliability of the data transfer services through error control and segmentation processes. It should be appreciated that in some embodiments, the TCP layer may implement protocols other than the Transmission Control Protocol (TCP), such as a User Datagram Protocol (UDP), for instance. In some embodiments, the TCP layer 134 may control the connections between computers and establish, manage and terminate communications between local and remote applications.

The operating system 136 may include any suitable operating system such as, for example, Apple's OSX™, Linux™, or Windows™. The operating system 136 generally controls the operation of the network device 102 and, more particularly, provides the interface for lower layers of the stack, i.e., the link layer 130, the IP layer 132 and the TCP layer 134 with the higher layers, i.e., the applications layers 138.

The applications layer 138 handles network services such as name resolution, redirector services and file and printing. The name resolution involves converting IP address to names recognizable to a user. The redirector services, under conventional techniques, determines whether a user's request can be fulfilled locally or if it should be redirected to another computer. If the request is to be forwarded to another computer, the request is processed through the TCP layer 134, the IP layer 132, the data link layer 130 (which may include the firmware 140, the bridge layer 142, and/or the Nat Layer 143), and across the network to another computer that can fulfill the request. Accordingly, data typically originates and terminates at the applications layer 138. However, in accordance with the present disclosure, received data may bypass the applications layer 138 and be processed through the bridge layer 142 and/or the IP layer 132.

There are at least two existing technologies for servicing multiple packets in one up/down call to the respective transmit or receive stacks. Their design intent is for packets that are initiated by a host at the application layer 130. First, is the transmit segmentation offload (TSO). This technology offloads segmentation and checksum responsibilities to the firmware 140. The application layer 130 posts a large data buffer for transmission to the transmission stack which creates various headers for each layer and attaches the large chunk of data to the headers with an indication that the packet is a TSO packet. The indication allows the firmware 140 to recognize the packet as a TSO packet. Upon recognition of the TSO packet, the driver performs the segmentation and checksum before transmitting the packets over the transmission medium.

The second technology is large receive offload (LRO) which accumulates packets received from a single communication and reassembles the packets in the driver. The reassembled packets are aggregated with a single header. Specifically, the header of the first packet is saved and appended to the aggregated packets. The aggregated packets are then forwarded to the applications layer 138.

In accordance with embodiments herein, LRO packets may be routed without accessing the application layers 138 or the TCP layer 134. In particular the LRO packets may be routed through either the bridge layer 142, the NAT layer 143, or the IP layer 132 without going to the applications layer 138, thus bypassing multiple processing operations and providing time and processing savings. The bridge, NAT, and IP layers are modified to recognize LRO packets and process the packets rather than discarding the packets. Additionally, the routed LRO packets may be converted to TSO packets in these layers of the receive and/or transmit stacks to further expedite processing of the packets. In order to gain more time and processing savings, information related to the individual packets of the LRO packet may be saved for use by the TSO operations when segmenting the LRO packet. In particular, for example, checksum data may be saved during construction of the LRO packet so that it is preserved for use in the segmentation operation.

The movement of an LRO packet through the layers of the device 102 is illustrated as the dashed lines 262. As can be seen, the LRO packet does not reach the TCP layer 134 or the application layer 130. Rather, the LRO packet is passed from the receive stack to the transmit stack at either the bridge layer 142, the NAT layer 143 or the IP layer 132. Time savings are realized through the classification based on Layer 2 in the case of bridge traffic or classification based on layer 3 in the case of IP layer traffic. In both cases the classification is done once for many packets as opposed to individually on a per packet basis. Network address translation (NAT) at the bridge layer 142 and/or the IP layer 132 is accelerated by this also. Processing power may also conserved as there are therefore typically fewer processing operations involved in routing packets through the device 102.

Figure 4:
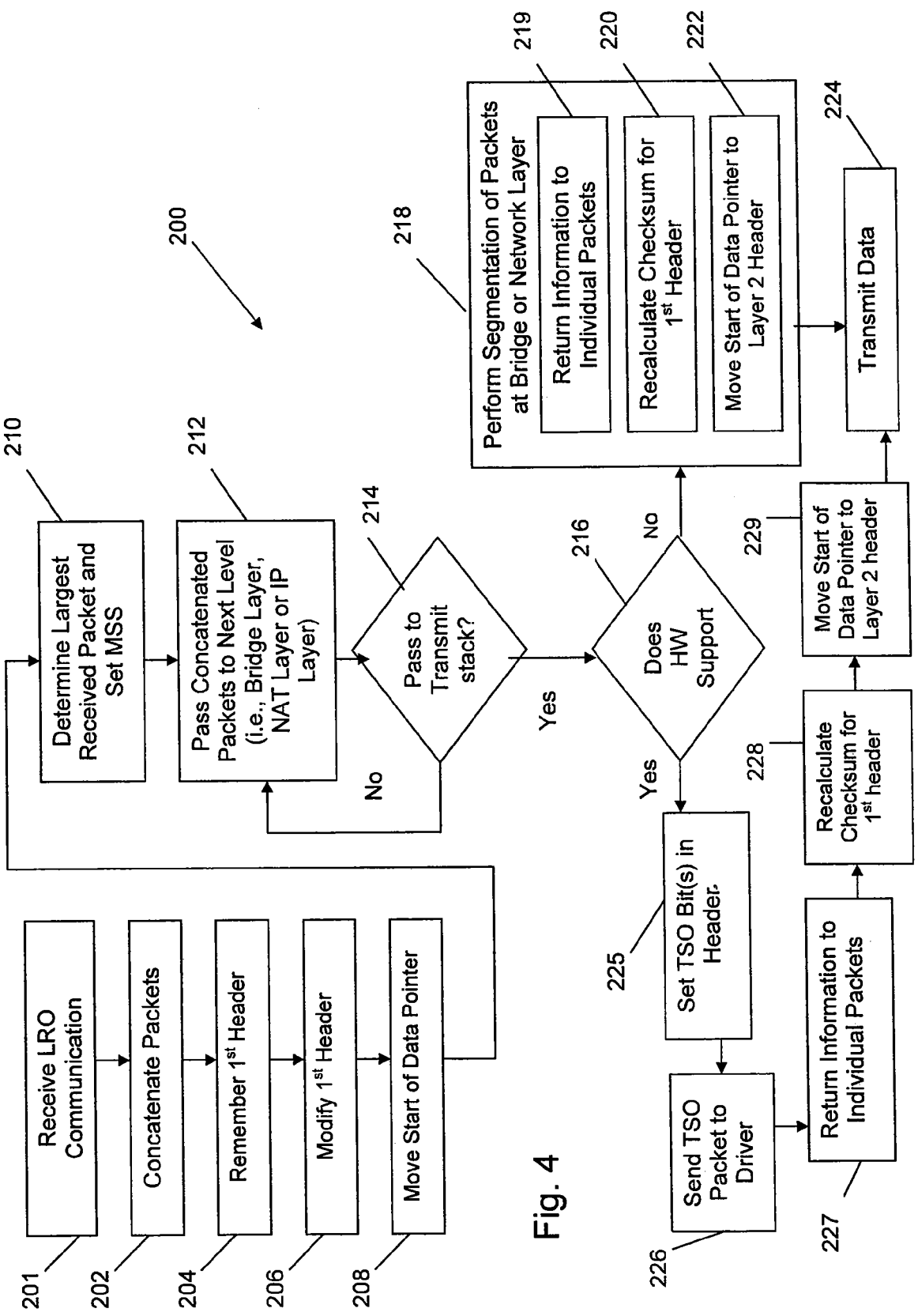
FIG. 4 is a flowchart illustrating a technique for generating large receive offload packets and for providing the large receive offload packets from a receive stack to a transmit stack via a bridge layer, a NAT layer, or an IP layer.

As mentioned above, there are at least two possible cases for preserving information related to the packets for reuse in the TSO segmentation operation, specifically, the bridge case and the NAT case. FIG. 4 is a flowchart 200 illustrating the process for LRO routing through a bridge layer. LRO routing is initiated by the receipt of an LRO communication (Block 201), at a communication port, e.g., communication port 129. The packets of the LRO communication are concatenated to form an LRO packet (Block 202). The concatenation of packets generally may include storing or otherwise remembering the first header of a first packet (Block 204). The first header is updated with a checksum, acknowledgement number, flags, and timestamp of packets that are concatenated to the first packet (Block 206). In particular, the checksum P(n) of each of the payloads is summed together such that a checksum in the first header may be represented as the sum of the various packet checksums; e.g., ChecksumI=P1+P2+P3. The ChecksumI is added to the first complete checksum (which includes the first header checksum and the first payload checksum) to generate an LRO checksum=H0+ChecksumI.

As the first header is updated with the information of the other packets (e.g., so that it includes the checksum, acknowledgement number, flags, and timestamp of each of the other packets), the first header information is lost. Additional information for the other packets (e.g., additional headers such as an IP layer header, an applications layer header, and so forth) is not lost, but rather hidden behind a start of data pointer for each of the packets (Block 208). That is, a pointer indicating the start of layer 2 data is moved so that information is located behind the flag and thereby preserved. This is explained in more detail below and with reference to FIGS. 5 and 6.

In appending the packets to the header, the packets may be placed in a buffer with the header. A map of the packet locations within the buffer is concurrently generated with the creation of the LRO packet. Specifically, the received packet DMA map is generated. Additionally, as the packets are received and aggregated, a packet size monitor monitors the size of the incoming packets. The largest received packet size is used to set the maximum size segment (MSS) if it exceeds the currently stored LRO MSS (Block 210).

Figure 5:
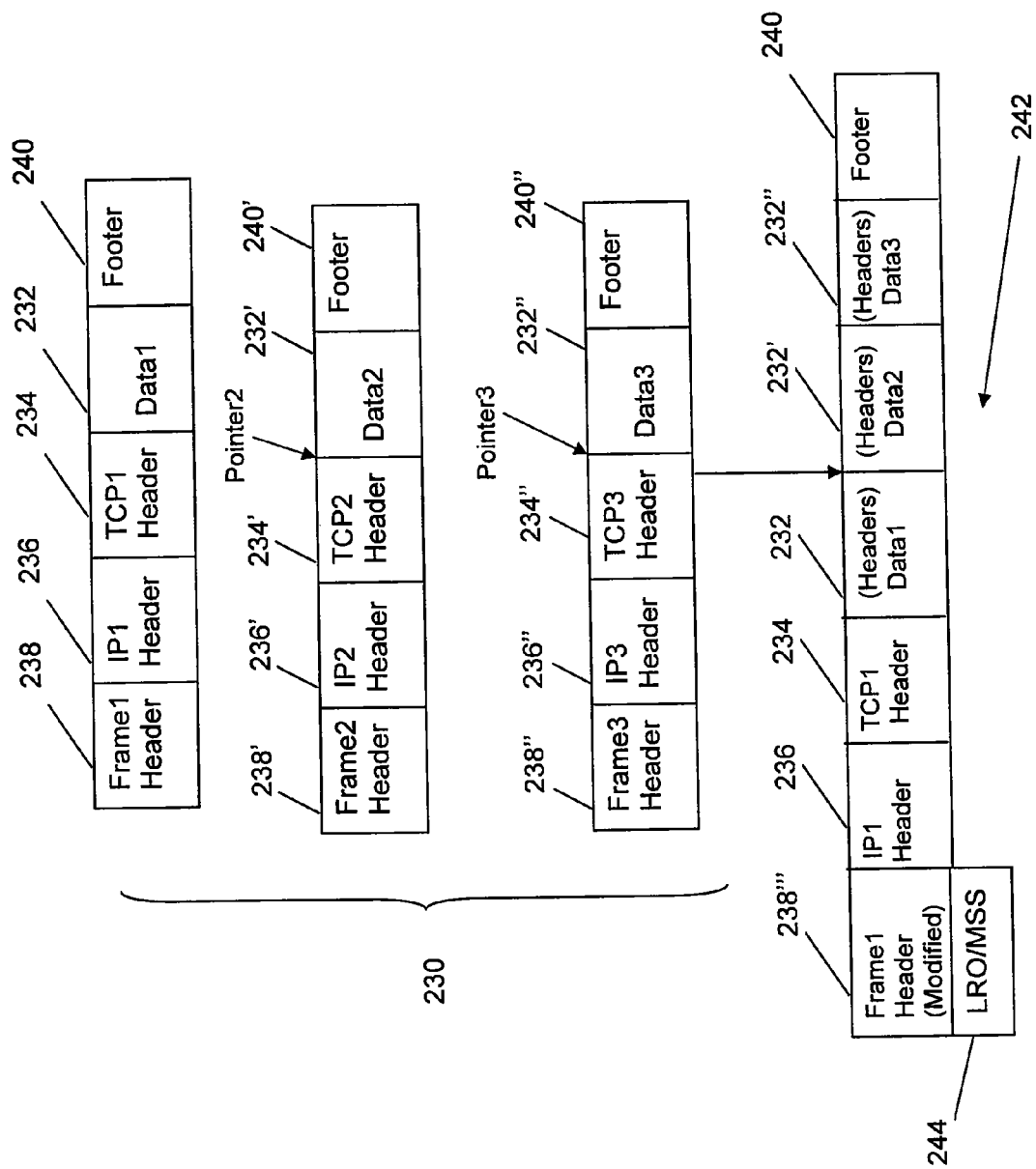
FIG. 5 illustrates creation of a large receive offload packet.

FIG. 5 illustrates creation of an example LRO packet. As shown, a set of frames 230, 230', 230" (Frame 1, Frame 2 and Frame 3, respectively) corresponding to a single communication is received. The frames include data 232, 232', 232". Additionally, the frames include a TCP header 234, 234', 234", an IP header 236, 236', 236", a frame header 238, 238', 238", and a footer 240, 240', 240". The header from one of the frames, e.g., the first frame header 238, is saved and modified to include checksums, acknowledgement numbers, flags, and timestamps of the other frames. In the process, the information of the first header 238 is lost and a modified first frame header 238" serves as the LRO packet header. As such, the modified first frame header 238" includes the sum of portions of the frame headers 238, 238', 238" of each of the frames. An indication 244 that the aggregated packet is a LRO packet may also be provided within the modified first frame header. The indication 244 may include the setting of a particular bit or series of bits within the header. The creation of the LRO packet 242 may be performed by the driver or in the bridge layer 142.

Additionally, a start of a data pointer for each of the other frames (Frame 2 and Frame 3) is advanced beyond all the headers (e.g., pointer2 and pointer3 are advanced from the start of the frame headers to point to the payload Data 2 and Data 3. The moving of the start of data pointer (pointer2 and pointer3) to beyond all the headers of the frames causes the headers to be preserved. That is, although the pointer is moved, the headers remain in the buffer and are neither discarded nor manipulated as the LRO packet is passed through to the transmit stack.

The data 232, 232', 232" of each of the frames is then appended to the saved header information to create the LRO packet 242. The header data, being included in the buffer with the data, is also appended but not shown, as mentioned above. In particular, because the start of data pointers have been moved in front of the headers, the headers are appended to the LRO packet with the data.

Returning again to FIG. 4, once the LRO packet 242 is created it is passed up to the next level, e.g., the bridge layer 236 or the IP layer 132 (Block 212). The indicator 244 acts as an override for any size limitations that may be implemented by the bridge layer 142 or IP layer 132 and the LRO packet 242 is permitted to be processed by the bridge layer 142 and/or IP layer 132, rather than being discarded.

At the bridge layer 142 and/or IP layer 132, the device 102 determines whether to transmit the LRO packet 242 to the transmit stack (Block 214). Information contained in the headers of the LRO packet 242 may be used to make this decision. If the LRO packet 242 is not passed to the transmit stack at the bridge layer 142, the LRO packet 242 is passed up to the next level, e.g., IP Layer 132, where the same decision is made. Each of the bridge and IP layers 142 and 132 includes an address table that is used to determine if the packet is forwarded at that layer. Specifically, the bridge layer 142 includes a MAC address table and the IP layers 132 includes an IP address table. The tables are generated based on a determination as to which ports are communicating directly with each other. If, for example, the LRO message matches a MAC address in the table that the bridge knows as an outgoing port, then the routing happens in the bridge layer 142 using that MAC address. If not, the LRO message is passed to the IP layer 132 where an IP address is used, rather than a MAC address. For each LRO message, only a single table lookup is required at each layer for the entire group of packets included in the message.

If it is determined at the bridge or IP layers 142 and 132, respectively, that the LRO packet 242 should be passed to the transmit stack, the LRO packet 242 is passed in Block 212. Next a corresponding layer in the transmit stack determines if the firmware 140 of the transmit stack support TSO (Block 216). For example, if the LRO packet is transmitted at the IP layer 132 in the receive stack, the IP layer 132 in the transmit stack determines if the firmware 140 of the transmit stack supports TSO. If the firmware 140 support TSO, the LRO packet 242 is flagged as a TSO packet. The flag may be accomplished by setting a bit or a series of bits in metadata of the headers to show that the packet is TSO compliant (Block 225). The TSO packet is then sent to the firmware 140 (Block 226) which recognizes the packet as a TSO packet and perform segmentation. Specifically, the information that was added to the first header be distributed back to the individual packets (Block 227), the first header checksum is recalculated (Block 228) and the start of data pointer is moved to the Layer 2 header (Block 229) in preparation of the transmission of the packet. The packets (or frames), once generated, are then transmitted (Block 224).

Alternatively, if it is determined that the firmware of the transmit stack does not support TSO, the layer receiving the LRO packet, i.e., the IP layer 132 or the bridge layer 142 performs the segmentation of the data of the LRO packet 242 (Block 218). The segmentation process includes returning information from the modified first header back to the respective packets (Block 219), recalculating the first header checksum (Block 220) and moving the start of data pointer to the layer 2 header (Block 224). Additionally headers are generated as need as the packets move through the layers of the transmit stack and the firmware 140 encapsulates the data into a frame and transmits the data (Block 224), after which the process ends.

Figure 6:
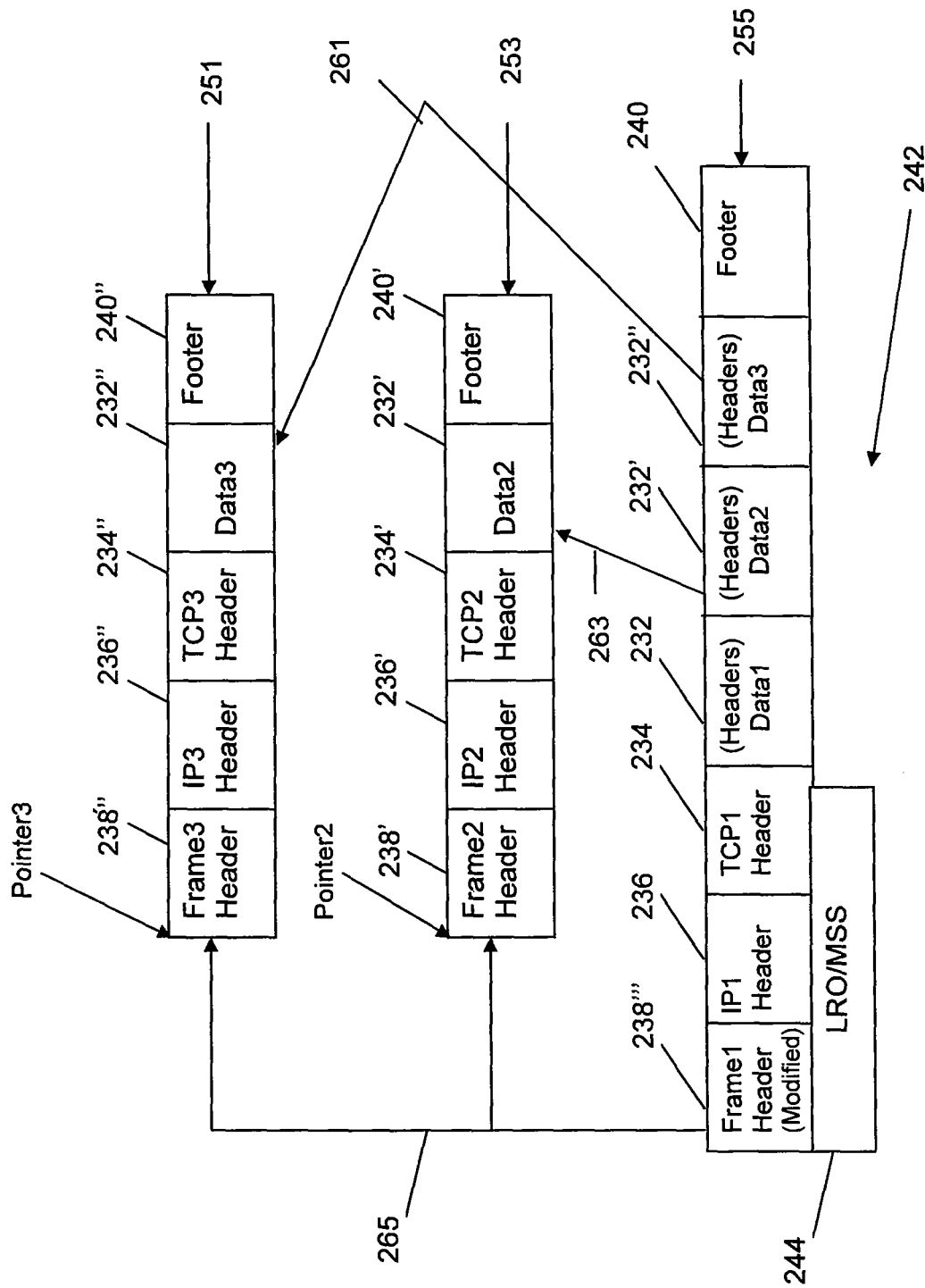
FIG. 6 illustrates segmentation of the large receive offload packet of FIG. 5.

FIG. 6 partially illustrates the segmentation process by which individual packets (e.g., packets 251 and 253) are reconstituted. The data is broken out from the LRO packet 255 (as indicated by lines 261 and 263) and each packet/frame receives its information that was added to the first frame header (as indicated by line 265). Additionally, the start of data pointers (pointer 2 and pointer 3) are returned to point to the start of data for each of the respective frames of the segmented packets. As such, headers such as the TCP and IP headers for the packets are revealed from behind the start of data pointers. The footer may be templated from the LRO packet and used as the footer for each of the packets/frames.

For example, with respect to packet 251 (Frame 3), the data 232" for packet 251 may be separated from the LRO packet 255 and the start of data pointer (Pointer 3 is returned to layer 2 header (e.g., Frame 3 header 238") to reconstitute the packet. Additionally, data such as a checksum, an acknowledgement flag, and a timestamp may be provided from the modified first header 238''' of the LRO packet 255 (as indicated by line 265) to Frame 3. The same or similar operations may be performed with respect to packet 253 (Frame 2) to reconstitute the packet.

Figure 7:
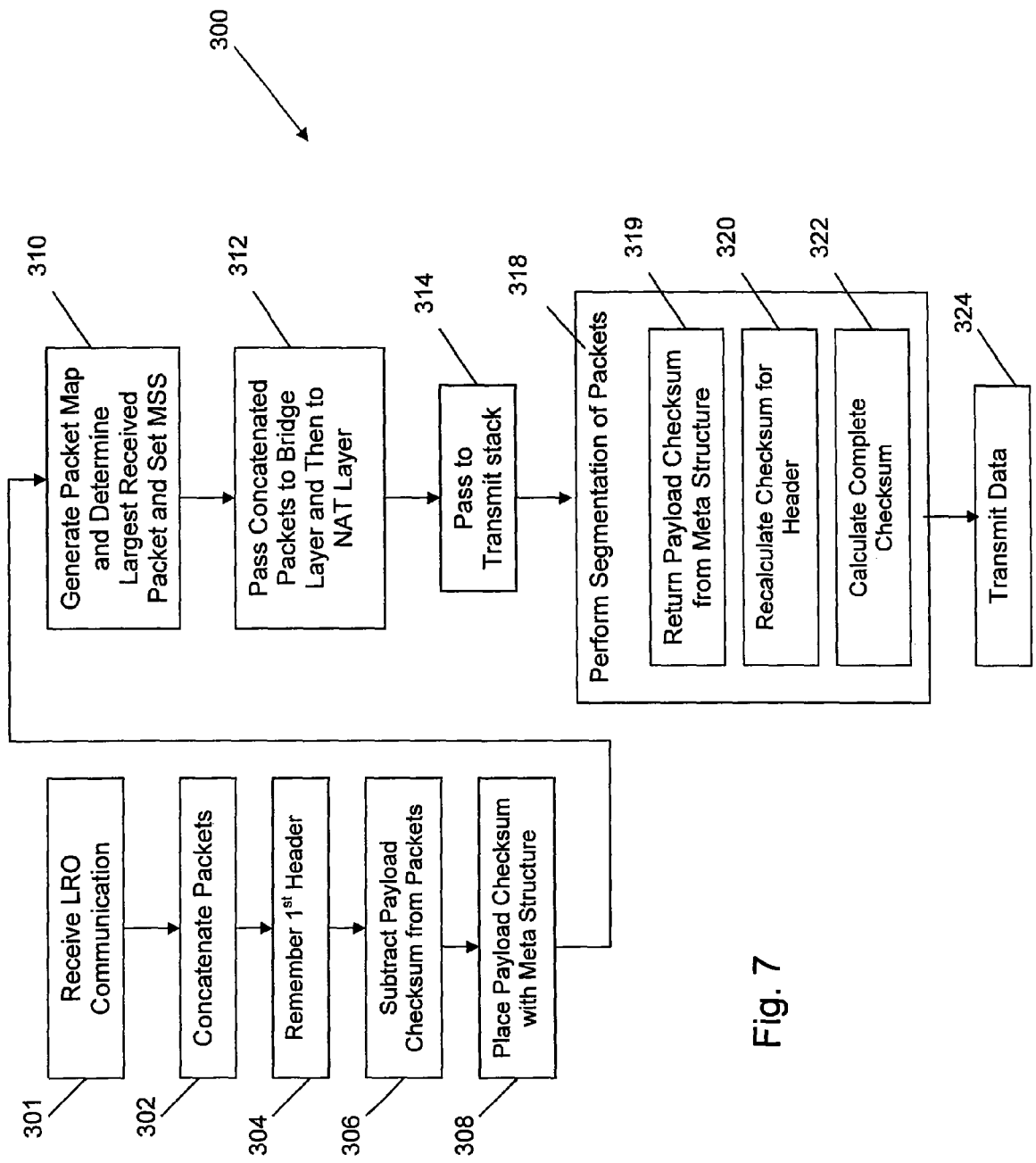
FIG. 7 is a flowchart illustrating a technique for generating large receive offload packets with an associated meta-structure and providing the large receive offload packets and meta-structure from a receive stack to a transmit stack.

Referring to FIG. 7, a flowchart 300 is shown illustrating processes related to the NAT routing case. In the Nat routing case, the first header is substantially changed or lost. To preserve information related to the data packets, and to help avoid incurring time and processing costs, information may be stored in meta-structure associated with the data packets. LRO routing is initiated by the receipt of an LRO communication (Block 301), at a communication port, e.g., communication port 129. The packets of the LRO communication are concatenated to form an LRO packet (Block 302). The concatenation of packets generally may include remembering the first header of a first packet (Block 304). Additionally, information related to the packets may be saved or subtracted out of the packets as they are being concatenated. For example, a payload checksum may be subtracted out (Block 306). The payload checksum and/or other information may be placed in a meta-structure (Block 308) so that it is preserved.

A map of the packet locations is concurrently generated with the creation of the LRO packet. Specifically, the received packet DMA map is generated. Additionally, as the packets are received and aggregated, a packet size monitor monitors the size of the incoming packets. The largest received packet size is used to set the maximum size segment (MSS) if it exceeds the currently stored LRO MSS (Block 210).

Once the LRO packet is created (e.g., the packets have been concatenated) it is passed up to the stack to the bridge layer and then on to the NAT layer (Block 312). At the NAT layer the header of the LRO packet is substantially modified such that the information contained therein may not be useful to reconstituting the packets during the segmentation process.

The LRO packet may then be passed to the transmit stack (Block 314). It should be appreciated that the meta-structure associated with the LRO packet is passed along with the LRO packet.

In the transmit stack, the segmentation process is performed (Block 318). The segmentation process includes returning information (e.g., the payload checksum) from the meta-structure to the individual data packets (Block 319). A new header is calculated (Block 320) and a complete checksum is calculated for each packet (Block 322). The complete checksum is computed by calculating the complete checksum for the non-payload portion of the packets and adding it to the payload checksum provided from the meta-structure. The partial checksum plus the payload checksum is the compete checksum.

FIGS. 8-11 illustrate packets that are processed as an LRO packet through the NAT layer. In particular, four packets 400, 402, 404, 406 (H0D0~H3D3) are illustrated. Generally, the H(N) portion of the packets 400, 402, 404, 406 represents the headers and the D(N) represent the data. A meta-structure 408, 410, 412, 414 associated with the packets is shown and represented by M(n). A header checksum may include a checksum for parts of the header that are fixed (Partial_HDR) and a checksum for dynamic parts (A(N)), such as the timestamp, acknowledgement, and so forth. Thus, the header checksum L(N)=Partial_HDR+A(N). A complete checksum (C(N)) includes the header checksum (L(N)) plus the checksum for the payload (P(N)). The "P" stands for "payload" of the packet, which is the data of the packet. As such, the payload checksum may also be referred to as a data checksum. Thus, the complete checksum C(N)=L(N)+P(N).

As described above, as the packets 400, 402, 404, 406 are concatenated to create an LRO packet 420, the payload checksum P(N) of each packet may be subtracted (FIG. 9) and provided to the meta-structure M(n). The removal of the payload checksum P(N) from the complete checksum can be done in software and/or hardware. The payload checksum can be passed to the software in the transmit stack.

At the hardware level, a TCP checksum is given as a bit indicating that a packet was received correctly or not. If a packet is received successfully, the hardware can provide the payload checksum, which can be passed into the meta structure without software calculating it. In some embodiments, the data checksum may not be given. Therefore, the data checksum is calculated and subtracted out.

The first header H0 of the first packet 400 is preserved in the creation of the LRO packet but is modified H0' by the NAT layer (FIG. 10). After the LRO packet has been passed to the transmit stack, the LRO packet 420 may be segmented and the payload checksum P(N) is provided back to the packets (FIG. 11). Thus, only the headers and the complete checksum are calculated before the packets are ready for transmission. Although storing payload checksums in the meta-structures increases the overhead, the savings in processing and time for the TSO in the transmit stack may be more beneficial considering the small increase in overhead required for the payload checksum.

It should be appreciated that the specific embodiments described herein are provided merely as examples and are not intended to be construed as limiting the scope of the disclosure. Indeed, while the examples have been primarily targeted toward a TCP/IP model, the techniques may be implemented in other networking models. As such, all alternative and variant embodiments not explicitly described herein are believed to fall within the scope of the present disclosure.

The invention claimed is:

1. A method of processing data packets in an electronic network comprising:
   receiving a plurality of data packets at a receive stack of an electronic network device;
   saving a first header of the plurality of data packets;
   modifying the first header with information from each of the set of data packets;

moving a start of data pointer for each of the plurality of data packets;
concatenating the set of data packets, thereby creating a concatenated packet, wherein the concatenated packet includes an indicator identifying the concatenated packet as a first packet type; and
routing the concatenated packet to a transmit stack of the electronic network device; and
segmenting the concatenated packet in the transmit stack, wherein segmenting the concatenated packet in the transmit stack comprises restoring information from the modified first header to each of the plurality of data packets.

2. A method of processing data packets in an electronic network comprising:
receiving a plurality of data packets at a receive stack of an electronic network device;
saving a first header of the plurality of data packets;
modifying the first header with information from each of the set of data packets;
moving a start of data pointer for each of the plurality of data packets;
concatenating the set of data packets, thereby creating a concatenated packet, wherein the concatenated packet includes an indicator identifying the concatenated packet as a first packet type;
passing the concatenated packet to a bridge layer of the receive stack; and
routing the concatenated packet to a transmit stack of the electronic network device from the bridge layer, wherein the receive stack includes a plurality of protocol layers, wherein the bridge layer is an intermediate layer of the plurality of protocol layers, and wherein routing the concatenated packet to the transmit stack bypasses at least one protocol layer in the plurality of protocol layers.

3. The method of claim 1 further comprising segmenting the concatenated packet in a transmit stack of the electronic network device, wherein segmenting the concatenated packet comprises moving the start of data pointer for each of the plurality of data packets.

4. The method of claim 1 further comprising recalculating a checksum for the first header.

5. The method of claim 3 further comprising:
receiving the concatenated packet at the transmit stack;
setting one or more bits in a header of the concatenated packet to provide an indicator that the concatenated packet is of the first packet type.

6. The method of claim 1 wherein creating the concatenated packet from at least a portion of each of the set of data packets comprises aggregating non-header data from the plurality of data packets in a buffer with the first header.

7. The method of claim 1 further comprises removing a packet size limitation.

8. A method for operating a network device, the method comprising:
receiving a plurality of data packets at a receive stack of the network device;
subtracting a payload checksum from each of the plurality of data packets;
placing the payload checksums in a meta-structure; and
concatenating the plurality of data packets, thereby generating a combined packet from the received plurality of data packets;
passing the combined packet to a transmit stack of the network device; and
segmenting the combined packet into the plurality of data packets prior to transmitting the plurality of data packets.

9. The method of claim 8 wherein segmenting the combined packet into the plurality of data packets comprises providing the payload checksums to the respective data packets of the plurality of data packets.

10. The method of claim 9 wherein passing the combined packet to the transmit stack comprises passing the combined packet and the meta-structure at a network address translation layer of the network device.

11. The method of claim 9 further comprising calculating a header and a complete checksum for each of the plurality of data packets.

12. An electronic device comprising:
a processor;
a memory coupled to the processor, the memory storing operating instructions for the operation of the electronic device;
a receive stack comprising a plurality of operative layers operated by the processor, wherein the receive stack is configured to create a combined packet from a plurality of received data packets, preserving checksum data of the data packets; and
a transmit stack comprising a plurality of operative layers operated by the processor, wherein the transmit stack is configured to receive the combined packet from the receive stack and reconstitute the plurality of data packets with the preserved checksum data prior to transmitting the plurality of data packets.

13. The electronic device of claim 12 wherein the processor is configured to operate a first layer of the receive stack to pass the combined packet to the transmit stack.

14. The electronic device of claim 12 wherein the processor is configured to extract the checksum data from a payload portion of the plurality of data packets and store the checksum data in a meta-structure associated with the combined packet.

15. The electronic device of claim 14 wherein the processor is configured to move a start of data pointer for each of the plurality of data packets when creating the combined packet.

16. The electronic device of claim 15 wherein the processor is configured to move the start of data pointer for each of the plurality of data packets when segmenting the combined packet.

17. The electronic device of claim 12 wherein the processor is configured to calculate a checksum for at least one header of the plurality of data packets upon reconstituting the packets in the transmit stack.

18. The electronic device of claim 12 wherein each of the transmit and receive stacks comprise a first layer, the first layer comprising:
a driver; and
a bridge layer logically located between the driver and a second layer, the bridge layer including a first address table and the second layer including a second address table, wherein one of the bridge layer or the second layer includes a network address translation layer.

* * * * *